US00RE34561E

United States Patent [19]

Zaber

[11] E Patent Number: Re. 34,561

[45] Reissued Date of Patent: Mar. 15, 1994

[54] SYSTEM FOR APPLYING FLUENT MATERIALS

[75] Inventor: Robert J. Zaber, Detroit, Mich.

[73] Assignee: Matcon Systems, Inc., Sterling Hgts., Mich.

[21] Appl. No.: 816,028

[22] Filed: Dec. 30, 1991

Related U.S. Patent Documents

Reissue of:

[64] Patent No.: 4,890,573
Issued: Jan. 2, 1990
Appl. No.: 233,630
Filed: Jul. 25, 1988

[51] Int. Cl.[5] ..... B05C 11/00

[52] U.S. Cl. ..... 118/667; 118/302; 118/410; 118/415; 118/429; 118/666; 165/30; 165/64; 392/481; 392/496

[58] Field of Search ..... 118/302, 410, 415, 429, 118/666, 667; 165/30, 64; 392/481, 496

[56] References Cited

U.S. PATENT DOCUMENTS 2,530,799 11/1950 Arvintz et al. ..... 219/326 X
3,690,292 9/1972 Pasley, Sr. ..... 118/415 X

FOREIGN PATENT DOCUMENTS 161215 2/1955 Australia ..... 392/481

*Primary Examiner*—Bernard Pianalto
*Attorney, Agent, or Firm*—Barnes, Kisselle, Raisch, Choate, Whittemore & Hulbert

[57] ABSTRACT

A system for applying [one-part thermal-cure] *fluent* material, such as structural epoxy, includes apparatus for heating or cooling the epoxy to a temperature above or below ambient. A spirally coiled tube is suspended within a hollow enclosure by tube end fittings extending from axially opposed ends of the tube. An electrical heater and temperature sensor extend from opposed enclosure ends into the tube coils approximately centrally of the enclosure. The enclosure is filled with a heat transfer fluid that surrounds the coiled tubing. The fluid is connected through an inlet and outlet in the enclosure endwalls for circulation externally of the enclosure through a fluid chiller. A microprocessor-base controller receives input signals from the temperature sensor and a temperature adjustment mechanism, and provides outputs to the heater chiller and heater-exchange fluid pump and circulation valve, and to alarm mechanisms for indicating a high-temperature or low-temperature alarm condition.

26 Claims, 3 Drawing Sheets

SYSTEM FOR APPLYING FLUENT MATERIALS

Matter enclosed in heavy brackets [ ] appears in the original patent but forms no part of this reissue specification; matter printed in italics indicates the additions made by reissue.

*This application is a RE of 07/23,630, Jul. 25, 1988, U.S. Pat. No. 4,890,573.*

The present invention is directed to a system for applying or depositing [one-part thermal-cure] *fluent* materials such as structural epoxy, and more particularly to a device for controllably heating or cooling the material to a preselected temperature above or below room temperature prior to material deposition.

It is a general object of the present invention to provide a material application system of the described character that includes a material heating and cooling device which obtains enhanced control of a material temperature, and in which the material is thoroughly heated throughout its volume without internal temperature gradients or the like.

Another object of the present invention is to provide a material heating apparatus for use in such a system which is sufficiently small as to be mountable on a robot arm adjacent to the application nozzle, and which thereby obtains enhanced control of material temperature at the application nozzle without deleterious effects of heat loss or gain during passage through intermediate conduits.

A further object of the invention is to provide a material heating apparatus of the described character that is economical to assemble and reliable in operation over an extended lifetime.

The invention, together with additional objects, features and advantages thereof, will be best understood from the following description, the appended claims and the accompanying drawings in which:

Figure 1:
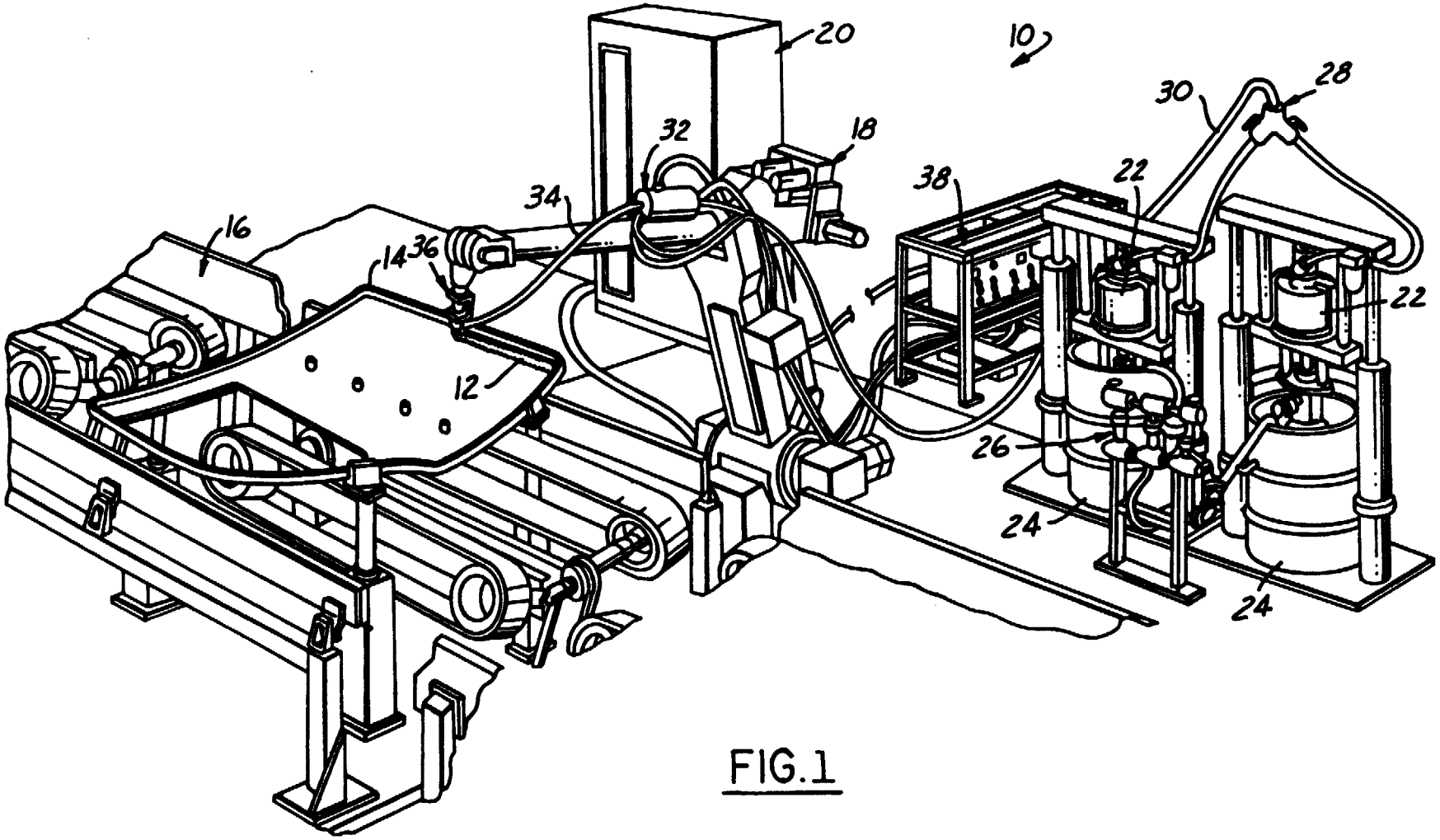
FIG. 1 is a fragmentary perspective view of a system for applying thermal-cure materials in an automated production process in accordance with a presently preferred embodiment of the invention.

FIG. 1 illustrates a system 10 for applying a bead 12 of structural epoxy to the interior surface of a multiplicity of door panels 14 passing in sequence along a conveyor 16. A robot arm 18 is positioned adjacent to conveyor 16 at the material application station, and is movable in multiple degrees of freedom under control of a robot controller 20. To the extent thus far described, line 10 illustrated in FIG. 1 is entirely exemplary of an environment in which a system in accordance with the present invention may be employed.

In accordance with the presently preferred embodiment of the invention, material to be deposited as bead 12 is applied by air-driven positive displacement high-volume high-pressure double-acting suction-assisted double elevator low-shear piston pumps 22 which draw material from respective drums 24. Valving 26, 28 is provided for allowing replacement of one material drum while operation continues as the other. Material is supplied under pressure from pumps 22 through conduit 30 to a material conditioning apparatus 32 for heating the material to an elevated temperature for deposition on panel 14, and then by a conduit or hose 34 to an extrusion nozzle 36. Nozzle 36 is carried at the end of robot arm 18, and in accordance with an important advantage of the present invention, material conditioner 32 is of sufficiently small size that it also may be carried on robot arm 18 adjacent to extrusion nozzle 36 for minimizing heat loss in material traveling from conditioner 32 through conduit 34 to nozzle 36. Material conditioner 32 is connected to a control package 38, which includes control electronics to be described in detail in connection with FIG. 2 and other suitable means for selectively-controlling temperature of material passing through conditioner 32.

Figure 2:
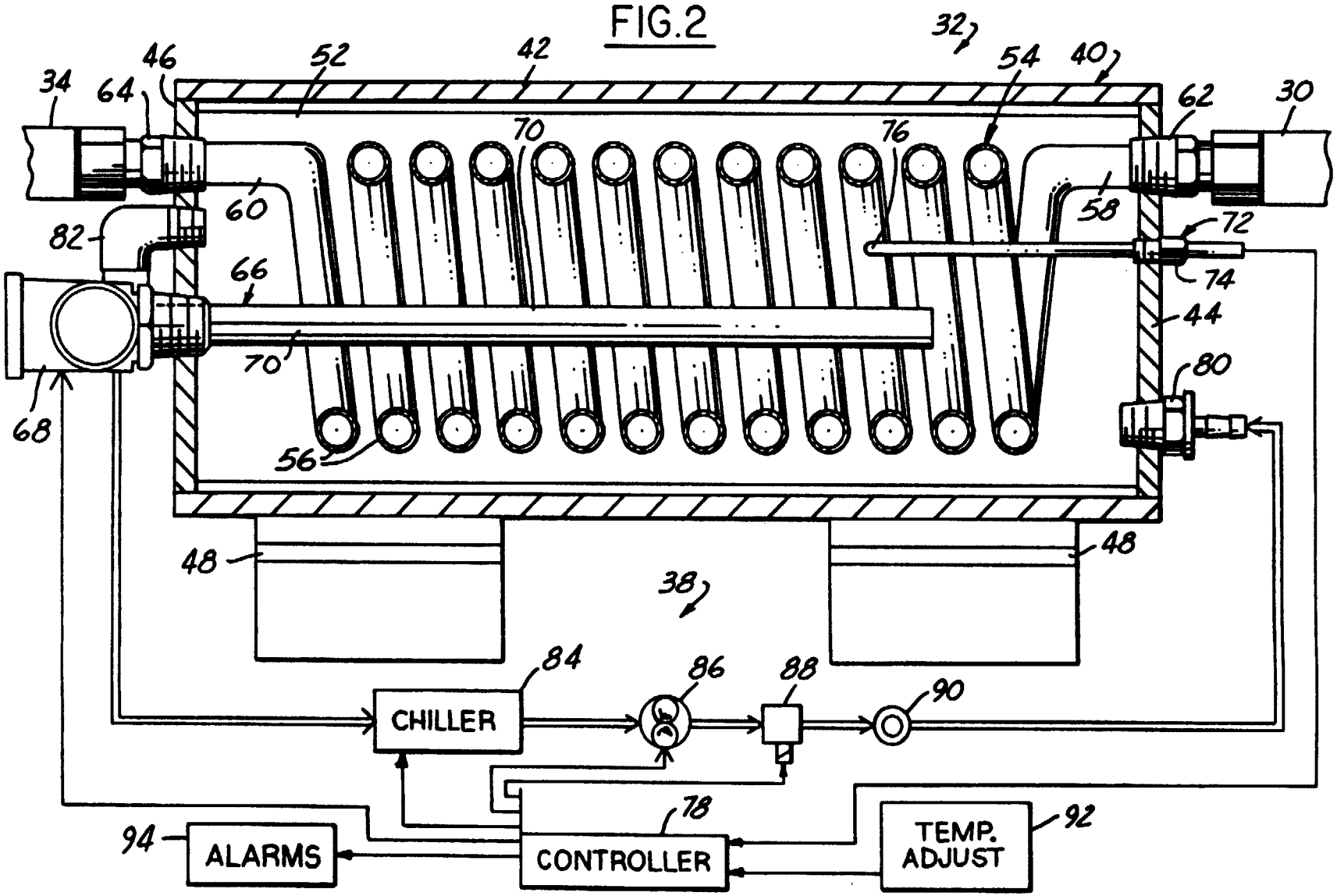
FIG. 2 is a partially schematic and partially fragmented sectional view of the material heating apparatus in FIG. 1.
Figure 3:
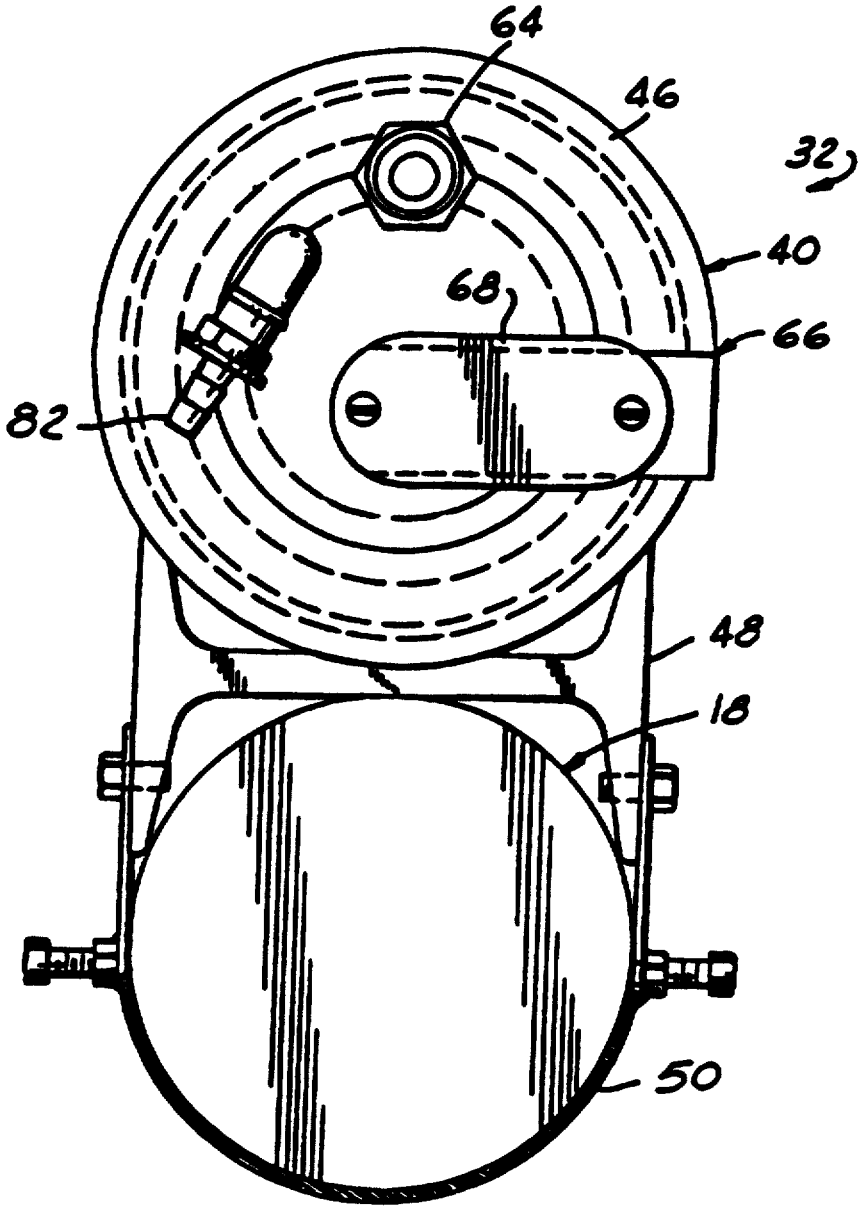
FIG. 3 is an end elevational view of the material heating apparatus illustrated in FIGS. 1 and 2.

Referring to FIGS. 2 and 3, material conditioner 32 comprises a substantially cylindrical hollow enclosure 40 having a sidewall 42 and a pair of axially opposed endwalls 44, 46. A pair of aligned brackets 48 are welded or otherwise affixed at axially spaced positions on enclosure sidewall 42, and a strap 50 is adjustably coupled to each bracket 48 for mounting material conditioner 32 on the arm of robot 18. A spirally-coiled tube 54, of stainless steel tube stock, has a multiplicity of coils 56 at uniform diameter and pitch substantially co-axially disposed within the interior 52 of enclosure 40. Tube 54 is suspended within enclosure 40 by the axially-opposed coil inlet and outlet ends 58, 60. Suitable fittings 62, 64 are carried by endwalls 44, 46 and respectively connect tube ends 58, 60 to conduits 30, 34 (FIGS. 1 and 2). An electric heater 66 has a base 68 approximately centrally mounted on enclosure endwall 46 and a heater element 70 extending therefrom into enclosure interior 52 substantially centrally (in the diametric direction) of coils 56. A temperature sensor 72 has a base 74 substantially centrally mounted on enclosure endwall 44, and has a temperature probe 76 extending into enclosure volume 52 substantially centrally (in the diametric direction) within tube coils 56. Heater 66 and temperature sensor 72 are connected to control electronics 78.

An inlet fitting 80 and an oulet fitting 82 are respectively disposed on endwalls 44, 46 for circulating heat transfer fluid through the hollow interior 52 of enclosure 40. Outlet fitting 82 is connected to inlet fitting 80 by suitable fluid conduits in a closed loop through a chiller 84, a pump 86, a solenoid valve 88 and a flow-indicator 90. Chiller 84 includes a compressor and suitable refrigerant elements for cooling heat transfer fluid passing therethrough. Chiller 84, pump 86 and solenoid valve 88 each receive control inputs from controller 78. Controller 78 also receives an input from a temperature adjustment mechanism 92 for operator selection of temperature within enclosure 40 to which epoxy passing through coil 54 is to be raised, and has an output connected to suitable alarms 94 for indicating over-temperature, under-temperature and other desired alarm conditions. The heat transfer fluid preferably comprises a mixture of glycol and water or other medium required by operating temperature parameters.

In operation, deposition temperature at bead 12 (FIG. 1) is normally specified by a process engineer based upon technical data for the particular material in question, empirical design and operating experience, and other factors. Temperature to which the material is to be raised within conditions 32 is normally set at adjustment 92 at some slightly higher temperature so as to accommodate heat loss in conduit 34 and extrusion nozzle 36. For example, if a deposition temperature of 100° F. is desired at bead 12, a temperature of 105° F. may be initially set at adjustment 92, and thereafter readjusted upwardly or downwardly depending upon actual measurement process experience, etc. with the temperature so set, the one-part thermal-cure material, such as structural epoxy, is then propelled through conditioner 32 under pressure from pumps 22. As the material flows through coils 56, heater 66 is operated by controller 78 so as to heat the heat transfer fluid within enclosure 40, with the heat transfer fluid conducting such heat energy to coils 56 and then to the epoxy material. Temperature probe 72 provides electronic signals to controller 78 indicative of heat transfer fluid temperature. Controller 78, which preferably comprises a microprocessor-based controller, contains suitable programming for operating chiller 84, pump 86, solenoid valve 88 and heater 66 to maintain the heat transfer fluid within enclosure 40 surrounding coils 54 at the desired operating temperature.

In accordance with the an important advantage of the present invention coiled tubing 54 inherently automatically folds the epoxy material on itself during passage therethrough, which helps enhance heat distribution throughout the material without imparting shear stresses to the material that might undesirably activate material thixotropes. Such uniform heat distribution without shear is thus important in obtaining and maintaining desired properties in the epoxy material. Length of coiled tubing 54 within enclosure 40 is selected to provide sufficient material residence time within conditioner 32 for uniform heating and temperature increase, given the material flow rate prespecified by the process engineer. It has been empirically determined in development of the present invention that an optimum material residence time within conditioner 32 is equal to approximately 3.2 times material flow rate in hours. For example, if flow rate is specified at twenty-five cubic inches per hour, length and internal diameter of coil 54 are selected to hold eighty cubic inches of epoxy. Coil pitch is selected as a balance between back pressure of fluid resulting from reduced pitch and increased axial length of enclosure 40 necessitiated by greater pitch.

What is claimed is:

1. A system for applying a fluent [thermal-cure] material to a substrate that includes means for supplying the material under pressure, means for heating the material to elevated temperature above ambient means for applying the material at said elevated temperature to a substrate, and conduit means for feeding the material from said supplying means to said heating means and thence to said applying means, characterized in that said means for heating the material comprises:

a hollow enclosure having a substantially cylindrical internal volume, a spirally coiled tube having axially opposed first and second ends suspending said tube substantially coaxially with said volume and being coupled to said conduit means, a heater positioned within said enclosure and having means responsive to application of electrical power for heating said volume, temperature sensing means positioned within said volume for supplying electronic signals as a function of temperature thereof, said heater and said temperature sensing means being positioned within said coiled tube substantially centrally of said volume and said tube, and electronic control means including means responsive to said electronic signals for selectively applying electrical power to said heater to maintain temperature within said volume at said elevated temperature.

2. The system set forth in claim 1 wherein said heater comprises an elongated heating element extending from one end of said enclosure substantially centrally of said coiled tube.

3. The system set forth in claim 2 wherein said coiled tube comprises coils of uniform diameter and pitch.

4. The system set forth in claim 3 adapted for applying the material at a predetermined constant flow rate, wherein said supplying means includes a pump for supplying the material at said predetermined constant flow rate, and wherein said coiled tube has a diameter and length selected to provide a predetermined residence time of material in said heating means at said predetermined flow rate.

5. The system set forth in claim 4 wherein said residence time is substantially equal to 3.2 hours.

6. The system set forth in claim 5 wherein said electronic control means further comprises means for selectively adjusting temperature within said volume.

7. The system set forth in claim 3 wherein said heating means further comprises a heat transfer fluid within said volume for enhancing heat transfer from said heater to said coiled tube.

8. The system set forth in claim 7 wherein said heating means further comprises means for circulating said heat transfer fluid externally of said enclosure.

9. The system set forth in claim 8 wherein said heat transfer fluid comprises a mixture of glycol and water.

10. The system set forth in claim 8 wherein said circulating means comprises means forming a fluid inlet and a fluid outlet at opposed ends of said volume.

11. The system set forth in claim 8 wherein said circulating means comprises means coupled to said electronic control means for selectively cooling said heat transfer fluid.

12. The system set forth in claim 11 wherein said electronic control means comprises microprocessor-based control means including means responsive to said electronic signals selectively to operate said heater and said cooling means to maintain said heat transfer fluid at said elevated temperature.

13. The system set forth in claim 1 wherein said heating means further comprises a heat transfer fluid within said volume for enhancing heat transfer from said heater to said coiled tube.

14. The system set forth in claim 13 wherein said heating means further comprises means for circulating said heat transfer fluid externally of said enclosure.

15. The system set forth in claim 14 wherein said heat transfer fluid comprises a mixture of glycol and water.

16. The system as set forth in claim 1 wherein said means for applying the material comprises an extrusion nozzle.

17. A system for applying a fluent [thermal-cure] material to a substrate that includes means for supplying the material under pressure, means for heating the material to elevated temperature above ambient, means for applying the material at said elevated temperature to a substrate, and conduit means for feeding the material from said supplying means to said heating means and thence to said applying means, characterized in that said means for heating the material comprises:

a hollow enclosure having an internal volume, a spirally coiled tube suspended within said enclosure and having first and second tube ends coupled to said conduit means, a heater positioned within said enclosure and having means responsive to application of electrical power for heating said volume, temperature sensing means positioned within said volume for supplying electronic signals as a function of temperature thereof, electronic control means including means responsive to said electronic signals for selectively applying electrical power to said heater to maintain temperature within said volume at said elevated temperature, a heat transfer fluid within said volume for enhancing heat transfer from said heater to said coiled tube, and means for circulating said heat transfer fluid externally of said enclosure.

18. The system set forth in claim 17 wherein said enclosure volume is substantially cylindrical, said spirally coiled tube having axially opposed ends suspending said tube within said volume and being coupled to said conduit means.

19. The system set forth in claim 18 wherein said coiled tube is suspended so as to have an axis substantially in the center of said volume, said heater and said temperature sensing means being positioned within said coiled tube substantially centrally of said volume and said tube.

20. The system set forth in claim 17 wherein said circulating means comprises means forming a fluid inlet and a fluid outlet at opposed ends of said volume.

21. The system set forth in claim 20 wherein said circulating means comprises means coupled to said electronic control means for selectively cooling said heat transfer fluid.

22. The system set forth in claim 21 wherein said electronic control means further comprises means for selectively adjusting temperature within said volume.

23. The system set forth in claim 22 wherein said electronic control means further comprises microprocessor-based control means including means responsive to said electronic signals selectively to operate said heater and said cooling means to maintain said heat transfer fluid at elevated temperature.

24. The system set forth in claim 1 adapted for applying the material at a predetermined constant flow rate, wherein said supplying means includes a pump for supplying the material at said predetermined constant flow rate, and wherein said coiled tube has a diameter and length selected to provide a predetermined residence time of material in said heating means at said predetermined flow rate.

25. The system set forth in claim 24 wherein said pump is a piston pump.

26. The system as set forth in claim 24 wherein said residence time is substantially equal to 3.2 hours.

* * * * *